United States Patent Office 3,023,181
Patented Feb. 27, 1962

3,023,181
COATING COMPOSITION CONTAINING PIGMENT HAVING A HYDROPHOBIC SURFACE, METHOD OF PRODUCTION, AND ARTICLE COATED THEREWITH
Theodore A. Te Grotenhuis, Olmsted Falls, Ohio, assignor of twenty percent to The General Tire & Rubber Company, Akron, Ohio, a corporation of Ohio
No Drawing. Filed June 2, 1958, Ser. No. 738,986
32 Claims. (Cl. 260—29.2)

The present application is a continuation-in-part of my application Serial No. 724,233, filed March 27, 1958 (now abandoned) and Serial No. 591,800, filed June 18, 1956 (now abandoned) which latter is a division of my application Serial No. 585,824, now Patent No. 2,751,369, filed March 30, 1945.

The present invention relates to pigmented coating compositions such as printing or lithographic inks, paints, lacquers, etc. and to a method of preparing the same. It particularly relates to a method of improving the film formed from pigmented aqueous dispersions of film-forming high polymers or resins.

It is an object of the present invention to provide a coating composition having an aqueous continuous phase in which the cohesion between the pigment and the vehicle or the wetting of the pigment particles by the vehicle is enhanced.

It is another object of the present invention to provide a pigmented coating composition comprising an aqueous emulsion or dispersion of any suitable organic vehicle in which pigment particles have, in the resultant film, an organophilic surface, one more readily wetted by said organic vehicle than by water, so that a superior union of pigment and film-forming globules is obtained and so that the film becomes more resistant to humidity.

It is a further object of the present invention to provide a film-forming coating composition or ink containing a pigment with a surface treatment which facilitates formation of a nonporous film from pigmented aqueous dispersions.

It is a still further object to provide a pigmented coating deposited from an aqueous emulsion or dispersion of organic film-forming material which is less porous and has superior moisture resistance.

In accordance with the present invention, I attain the above and other objects by incorporating in aqueous emulsions of a film-forming resin or rubber (high polymer) or in a dispersion or in film deposited from such emulsion or dispersion one or more inorganic pigments which have been treated by a fluid which renders surface portions of said pigment hydrophobic or organophilic so that it loses its tendency to be wet by water. The treating fluid comprises silicon or complex-forming metal capable of holding a hydrocarbon or halogenated hydrocarbon group to inorganic surfaces. Specifically, water-soluble complexes formed of an organic carboxylic acid with a chromium salt and also organosilicon compounds as herein described are most suitable in treatment of the pigments. The treating fluid preferably comprises a reactive organosilicon compound having directly attached to silicon at least one water hydrolyzable or hydroxyl-reactive group and at least one carbon-to-silicon bond, preferably nonsilicon-containing hydrolysis products such as hydrogen chloride formed in the reaction with the pigment, and in the case of coating or coloring compositions incorporating pigments thus treated into the desired vehicle. I prefer an organic silicon halide or an alkoxy derivative or a hydrolysis product, usually alkaline hydrolysis product, of such silicon halide having the general formula $R_aSiX_{(4-a)}$, where "X" is selected from halogen groups, preferably chlorine, "a" is 1 to 3, inclusive, and each of the groups R is selected from organic groups, such for example as short or long-chain saturated or unsaturated groups, such as alkyl, alkylenyl, dienyl, haloalkylenyl, aryloxyaryl, alkoxyaryl, alkoxyaliphatic, aryloxyaliphatic, haloalkylene, aryl, aryloxy, alkoxy or mixtures thereof. Compounds selected from the above, having at least one of the organic groups bonded to silicon by a carbon-to-silicon bond, are much more stable and are accordingly preferred.

In the treatment of pigments with organic halosilanes, such as organosilicon halides having 1, 2 or 3 halogens substituted by an organic radical, the chlorine attached to the silicon appears to react with any adherently adsorbed film of moisture or with hydroxy or carboxylic groups attached to the surface of the pigment. The treated pigments have attached to the surface thereof a carbon-silicon group, the carbon atom being attached to said surface through the silicon atom, thus giving the desired characteristics.

Even organic pigments such as carbon black surprisingly appear to contain groups that are reactive with silicon halides firmly attached to the surface thereof. It is probably these groups which cause the carbon black to be relatively easily wetted by water.

By treating pigments with one or more organic chlorsilanes or organic silicon halides, I not only provide groups adhered to the surface of pigment particles to facilitate dispersion of the pigment in the organic vehicle, but I make the pigment more readily wetted by the organic vehicle.

The advantage of utilizing a pigmented aqueous emulsion of natural or synthetic resins, or an emulsion of a solution of such resins, has long been apparent to manufacturers of inks and coating compositions. In such compositions the hydrophilic pigments are in the aqueous phase and, not being readily wettable by many organic materials, tend to prevent full union of the separate globules of resin during drying, with the result that the films are frequently much more porous than desired. With pigments treated in accordance with the present invention, any treated pigment outside the globules of organic resin solutions in the drying film tends to cause the globules to coalesce and, therefore, facilitates formation of a more impervious film.

It is recognized that certain organosilicon compounds, such as siloxane derived from trivinyl chlorsilane by hydrolysis and which are soluble in organic solvents, have been incorporated into pigmented olefinic compositions to give certain improved results, such as hardness and weathering resistance to films. However, such coating compositions do not have continuous phase of water, i.e., they are not emulsions or dispersions and have the disadvantage of requiring large volumes of generally dangerous solvents. Silicones in such solutions in solvent materials are distributed throughout the binder as would be any other compatible resin. Furthermore, the silicones used are not materials which are primarily adapted to react with a pigment surface to render it hydrophobic.

In accordance with one aspect of the present invention, which is particularly important in the case of coating compositions comprising an aqueous emulsion or dispersion of a resin or high polymer that is to be fused or heated at elevated temperature after drying of the film or deposit on the article or surface on which the coating compositions are applied, advantages of pigments previously treated to render them hydrophobic can be obtained without a separate previous treatment of the pigment by reactive organosilicone. This is accomplished by incorporating into the emulsion or aqueous dispersion of fusible film-forming material a water-soluble reactive fluid pigment-treating composition which reacts with the pigment surface at least at elevated temperatures, such for example as those at which the coated article or the coating thereon can be subjected during the fusing operation.

Thus, I have found that I can incorporate into an aqueous dispersion of a film-forming solid, particularly of one or more fusible film-forming resins or other fusible or heat treatable solid high polymers, a suitable water-soluble Werner complexing compound, as hereinafter described, or an organosilicon compound which reacts with the inorganic surface of the pigment to render the surface portions hydrophobic upon heating. The chemical reaction may be of course be by coordination complex formation with the pigment surface or by formation of a covalent bond with hydroxyl groups on the pigment surface. Thus, the water-soluble pigment-treating materials apparently concentrate about the pigment surface upon the evaporation of water from the coating. Inasmuch as the inorganic pigment is preferentially wet by water, the pigment seems to be the last to give up water and hence the solution of water-soluble pigment-treating material becomes concentrated about the pigment where it is needed to react with the pigment during the fusion period. When the coated surface containing the dried deposit is subjected to elevated temperature to fuse the binder, the reaction between the pigment-treating material and the pigment surface occurs with the result that surface portions of the pigment become hydrophobic and therefore much more susceptible to wetting by the fused organic binder. Inasmuch as the pigment becomes hydrophobic, the resistance of the final pigmented film to water is enhanced. This is particularly important in metal primers used under enamels, etc.

According to this aspect of the present invention, the pigment-treating material is preferably incorporated into the aqueous dispersion of film-forming material. It should have substantially water-solubility. Water-soluble hydrolysis or esterification products of one or more organosilicon halides as above-mentioned are suitable, particularly those having 2 to 3 halogen groups attached to silicon.

The hydrolysis products to be water-soluble usually contain more than one solubilizing oxygen-containing group per silicon atom. Examples of suitable materials are any of the water-soluble siloxanes and siloxanolates mentioned in the United States Patent No. 2,763,629 of A. Gottfurcht and/or Patent No. 2,799,598 of Lawrence P. Biefeld and Thomas E. Philipps, dated July 16, 1957, and also similar water-soluble compounds differing only in that the vinyl group is substituted by alkyl including methyl, ethyl, propyl, butyl, etc. or aryl, such as phenyl or alicyclic, such as cyclohexyl, or chloralkyl, such as chlorethyl, or other alkylene, such as allyl or higher unsaturated aliphatic group. Also any of the water-soluble alkoxysilanes having one organic group bonded to silicon by a carbon-to-silicon bond, including the alkyl alkoxysilanes, such as methyl, ethyl, propyl and butyl trimethoxysilanes and corresponding triethoxysilanes, and all other water-soluble alkoxysilanes having at least one silicon-carbon bond and a hydrocarbon or chloro-substituted hydrocarbon group attached to silicon through such bond. Alkenyl alkoxysilanes, such as vinyl trimethoxysilane, and all other unsaturated alkoxysilanes which have substantial water-solubility, and also water-soluble hydrolysis products of the alkylene chlorsilanes may be used.

One may also use the corresponding water-soluble arylsiloxanes having an aryl or aralkyl group such as phenyl or benzyl attached to silicon, which are water-soluble and have hydroxyl or ester groups on silicon for reaction with pigment, including the water-soluble hydrolysis products of phenyl trichlorsilane, phenyl vinyl dichlorsilane, and all other water-soluble siloxanes having a hydrocarbon group directly bonded to silicon and having a hydroxyl, alkoxy or OM, where "M" is an alkali metal (including ammonium, which includes substituted ammonium or quaternary ammonium formed from any amine by reaction with organosilicon compounds such as chlorsilane, lithium, potassium and sodium) for reaction with the pigment surface or the hydroxyl groups, etc. on the pigment surface. One oxygen valence of at least one oxygen-containing group in such compounds is attached to silicon and the other oxygen valence is attached to hydrogen, alkali metal, or carbon.

Examples of other suitable treating materials capable of rendering the pigment particles hydrophobic are the Werner chromium complexes described in one or more of the Ralph K. Iler United States Patents 2,273,040, 2,356,161 and 2,524,803, and in the Remus F. Caroselli United States Patent 2,744,835, and similar compounds wherein a monocarboxylic organic acid, having a hydrocarbon group of at least two carbons connected to a carboxyl group, is complexed with a coordinating metal such as chromium. Acids having a hydrocarbon group of two or more carbon atoms include the aliphatic, monocarboxylic acids of both the saturated and unsaturated types of which acrylic acid, decanoic acid, lauric acid, oleic acid are examples, the alicyclic acids such as cyclohexyl carboxylic acid, the arylcarboxylic acids such as naphthenic acid, benzoic acid, etc., as well as complex acids such as rosin acid or abietic acid.

The Werner chromium complex, which may be prepared as described in one or more of the above patents by substituting the desired acid for that there used, should preferably be mixed with the water used in preparing the pigment slurry so that some adsorption of the complex on the pigment surface may occur prior to incorporation of the pigment with the emulsion of film-forming material.

The amount of water-soluble treating material should generally be at least .5% of the weight of the pigment to obtain appreciable improvement in the film. The optimum amount depends of course upon the surface area of the pigments used. Not all of the surface area need be covered to obtain a great portion of the benefits. However, a further improvement may be noted as the amount of surface area covered is increased. Thus, superior results are obtained when the amount of the pigment-treating fluid is increased and 1 or 2%, up to 10 or 15% are usual. Larger amounts than 15 or 20% are not generally desirable because of the high cost of the pigment-treating material relative to the cost of the pigment. Generally about 3 to 10% or so of the weight of the pigment is preferred.

The preferred organic groups adhered to the pigment through the silicon atom are hydrocarbon groups, either aromatic, aliphatic or araliphatic. Aliphatic groups of more than one carbon atom exert greater effect per mole on selective wetting by hydrocarbon vehicles than does the methyl group, probably because of their greater covering power. For polymerizable or vulcanizable vehicles such as rubber, or monomers or partial polymers polymerizable to the vulcanizable rubbery state, one or more organic groups containing unsaturated aliphatic carbon-to-carbon linkages are preferred, hydrocarbon groups being preferred for hydrocarbon polymerizable materials, etc.

Halogenated organic groups, unsaturated groups and/or ether groups attached to the pigment through a silicon atom are also desirable for pigment grinding or where the pigment is to be used in aqueous vehicles, since such groups are somewhat more hydrophilic than saturated hydrocarbon groups.

The organosilicon halides used in accordance with the present invention may be prepared in any suitable way, as by reaction of an unsaturated hydrocarbon, etc. with silicon tetrachloride in the presence of a Friedel-Crafts catalyst, or by a Grignard or Wurtz synthesis reacting the desired organohalide as for example R-Br, where R is the desired organic radical, for example phenyl, alkyl, alkylenyl, alkyldienyl, etc. with silicon tetrachloride or a mono- or diorgano-substituted silicon tetrachloride in the presence of magnesium, etc.

The preparation or properties of suitable organo-substituted silicon halides (organohalo silicones) are set forth in one or more of the following United States Patents:

Lincoln et al., 2,129,281
  Nason, 2,182,208
  Rochow, 2,258,218
  Rochow, 2,258,219
  Rochow, 2,258,220
  Rochow, 2,258,221
  Rochow, 2,258,222
  Rochow, 2,286,763
  Rochow, 2,352,974
  Hyde, 2,371,050
  Rochow, 2,371,068

Examples of suitable organo-substituted silicon halides for the present invention are: the alkyl-substituted silicon chlorides such as mono-, di- and trimethyl, ethyl, propyl, butyl, and lauryl silicon chlorides, etc.; and alkylenyl silicon halides such as mono-, di and trixinyl, allyl, butenyl and dodecylenyl silicon halides, etc. having two to twenty carbon atoms in at least one organic group; the alkylenyl alkyl silicon chlorides such as allyl dimethyl silicon chloride, diallyl methyl silicon chloride, allyl methyl silicon dichloride, vinyl allyl methyl silicon chloride, and allyl dimethyl silicon bromide etc., having at least one halogen and at least one unsaturated group of two to twenty or more carbon atoms attached to silicon; the aryloxy or alkoxy silicon halides such as ethoxy silicon chloride and ethoxy diethyl silicon chloride; the alkoxy aliphatic-, alkylenoxy aliphatic-, aryloxy aliphatic-, aryloxyaryl- and aliphatic-oxyaryl silicon halides such as butoxyethyl dimethyl silicon chloride, ethoxymethyl dimethyl silicon chloride, allyloxyethyl dimethyl silicon chloride, allyloxylauryl silicon trichloride, allyloxyphenyl dimethyl silicon chloride and phenoxyphenyl methyl silicon dichloride, etc.; the halogen alkylenyl or haloalkyl silicon halides including chlorethylenyl dimethyl silicon chloride (chlorvinyl dimethyl silicon chloride), chlorethyl dimethyl silicon chloride and di-(chlorallyl)methyl silicon chloride, etc.

While silicon halides having only an alkoxy and/or an aryloxy group linked to silicon give some desirable effects, especially in pigment preparation, etc., the preferred compounds have at least one group with a carbon atom bonded directly to silicon.

PREPARATION OF TREATED PIGMENTS

The following examples illustrate the treatment of pigments with readily hydrolyzable organo-substituted silicon chlorides.

*Example 1*

100 grams of unbeaded carbon black are subjected to agitation in the presence of a vapor from about one gram of a mixture of mono-, di- and trimethyl silicon chlorides. The agitation is continued in the presence of the alkyl silicon halide for about ten minutes to allow thorough penetration of the vapor. The hydrochloric acid formed by the reaction may be removed in any suitable manner, as for example by heating at elevated temperature, by neutralizing with an alkaline material such as dry $NH_3$, by shaking the carbon black with water (washing), or preferably by treating the carbon black with ether and water and washing the carbon black-ether mix until free from acid. The carbon black thus treated has much less tendency to be wet by water and much greater tendency to be wet by hydrocarbon organic solvents.

*Example 2*

When titanium dioxide is substituted for carbon black in Example 1, and agitation continued in like manner, it is also more readily dispersed in organic liquids.

*Example 3*

The methyl silicon chloride of Example 1 is substituted by a mixture of allyl dimethyl silicon chloride and methyl diallyl silicon chloride, other conditions being the same except that the pressure of the treating atmosphere is sufficiently reduced and the temperature of the treating atmosphere is sufficiently raised above room temperature to insure presence of the organosilicon chloride in vapor form. The carbon black thus treated is also more selectively wet by organic solvents and in addition contains a chemically attached unsaturated group for chemical union with polymerizable materials and the like.

*Example 4*

The organosilicon compounds of Example 1 are substituted by 9–10-octadecenyl dimethyl silicon chloride dissolved in anhydrous organic solvent, such as petroleum ether, containing in admixture therewith a small amount of ethyl ether. The carbon black is thoroughly wet by the solution thus formed and, after evaporation of the solvent, is found to have an exceedingly strong affinity for liquid organic hydrocarbons.

The pigments in the above examples may be substituted by other pigments, including zinc oxide, finely divided silica, aluminum oxide, inorganic particles having a coating of organic dyes such for example as "Hansa Yellow" and the like. The silicon halide may be substituted by other organosilicon compounds having one to three, inclusive, readily hydrolyzable groups, as set forth above, to obtain pigments having improved dispersion in organic liquids, plastics or solids.

PREPARATION OF PRINTING INKS AND COATING COMPOSITIONS

*Example 5*

About 10 parts of carbon black is treated with an organosilicon halide as set forth in any of the preceding examples. It is readily dispersed in a composition consisting of 3 parts of ethyl cellulose, 3 parts of beeswax, and 100 parts of sulfur plasticized with sulfur resin, as set forth in Ellis United States Patent 2,275,101.

*Example 6*

50 parts of carbon black which is treated with trimethyl silicon chloride as in Example 1 is dispersed into 12 parts of resin varnish, 10 parts of Gilsonite varnish, 4 to 5 parts of methylviolet toner solution, 430 parts of petroleum oil, and about 5 parts of a 25% solution of a mixture consisting of 1 part of barium naphthenate and 3 parts of polyisobutylene (Vistonex) by simply grinding the ingredients together in a ball mill for a relatively short time. The ink obtained has an unusual degree of jetness.

The carbon black in Examples 5 and 6 may be substituted by other pigments or carbon blacks treated with other organosilicon halides to give printing inks of desirable properties, having pigments in an unusual degree of fine dispersion, and selectively wetted by the liquid binding ingredients. The liquefied binding ingredients in the above pigments may be substituted by any other organic base vehicles as is apparent to those skilled in the art.

*Example 7*

About 20 parts of titanium dioxide, previously treated as in Example 1 with a mixture of mono-, di- and trimethyl silicon chloride and neutralized, is dispersed in about 125 parts of a solution of creamy viscosity consisting of an alkyd resin, such as glycerol phthalate or tung-oil-modified glycerol phthalate resin, and dissolved in a volatile solvent such as a mixture of xylene and butyl acetate containing a small amount of a high boiling ester, such as dibutyl phthalate, diorthotoluyl phthalate, etc. The dispersion thus obtained is emulsified in about one and one-half times its volume of an aqueous solution containing 3% of gelatin and 3% of ammonium hydroxide.

The emulsion thus produced is especially desirable as a coating or coloring composition.

*Example 8*

In a solution of about 25 parts of polystyrene in about 100 parts of a volatile solvent, such as benzene, there is dispersed about 80 parts of lead chromate previously exposed to a dry atmosphere containing a mixture of methyl silicon halides under conditions as set forth in Example 1. The dispersion is produced by subjecting the pigment to a shearing action in the presence of said styrene solution, as in a ball or colloid mill. The dispersion thus produced is emulsified in a 5% aqueous solution of ammonium caseinate to produce a colored coating composition having especially desirable properties.

*Example 9*

When in the preceding examples the treated pigment is dispersed in a viscous aqueous solution of ammonium caseinate or other protective colloid by grinding in a colloid mill, the dispersion thus obtained is thinned with water to a light creamy consistency, and the solution of polystyrene emulsified in the dispersion thus obtained, a coating composition which dries to a relatively impervious film is also had. Apparently the coated pigment, being of an organophilic nature, tends to cause coalescence of the separate globules of the styrene solution.

In the preceding examples, the polymerizable and resinous materials may be substituted by other natural and synthetic resins, solutions thereof, and resin-forming materials, including monomers, polymers or copolymers of one or more of the following ingredients: vinyl acetate, vinyl chloride, vinylidene chloride, acrylic and methacrylic esters and amides, hydrocarbon resins such as coumarone indene resins, as well as ester gum, rosin and the like. The pigments may be substituted by other inorganic pigments, organic or inorganic coloring materials which were previously treated with a silicon halide having one or more of the halogen atoms substituted by an organic radical.

*Example 10*

A latex of a graft polymer is prepared along the lines described in my prior United States Patent 2,745,818 by polymerizing about 70 parts of butadiene, 30 parts of styrene, 5 parts of sodium stearate, .1 part of MTM mercaptan (mixed tertiary mercaptans), .3 part of potassium persulfate, and 180 parts of water in an autoclave at about 50° C. until the conversion of the polymer reached about 95 or 96%, whereupon 40 parts of monoolefinic compound, such as methyl methacrylate or a mixture of equal parts of methyl methacrylate and acrylonitrile, are incorporated into the reactor along with .08 part of additional potassium persulfate, and the polymerization continued with agitation until conversion is substantially 100%. The latex thus formed, upon drying, has little coherence to a base material upon which it is spread until the base material containing the coating is fused at elevated temperatures of about 250° F. to 300° F.

Into the 150 parts of the latex above prepared is incorporated a mill base or aqueous pigment dispersion prepared as follows: About 30 parts of red iron oxide, 12 parts of lithopone and 12 parts of titanium dioxide are dispersed in about 25 parts by weight of water containing about .25 part of DAXAD (condensation product of naphthalene sulfonic acid and formaldehyde), .35 part of carboxyl methyl cellulose, .1 part of sodium lauryl sulfate, and about 5 parts of vinyl triethoxysilane (hydrolyzed solution made as shown in the Gottfurcht U.S. Patent No. 2,763,629, aforementioned). The mill base is milled on a three-roll mill until a good dispersion of pigment is produced.

The pigmented latex thus produced is sprayed onto a steel panel which had been previously treated to provide a coating thereon of amorphous phosphate and the coating allowed to dry. After drying, the coating is heated with infrared sufficiently to cause fusion of the resinous binder and formation of an exceedingly coherent film. The film has excellent water resistance and is especially desirable as a primer for alkyd resin enamel top coatings.

During the drying of the film, the aqueous solution of ethoxysilane is apparently concentrated about pigment particles and during the fusion, reaction between the pigment and the silicone occurs with resultant bonding of the vinyl groups to the pigment surface through the silicon atoms.

*Example 11*

The mill base in Example 10 is substituted by a mill base or aqueous dispersion prepared as follows: About 30 parts of iron oxide, 12 parts of lithopone and 12 parts of titanium dioxide are dispersed in about 125 parts by weight of water containing about 4 parts by weight of stearato chromium chloride, as described in United States Patent 2,744,835, and preferably plus a suitable protective colloid, such as carboxymethyl cellulose, gelatin, etc. in amounts of about .5 part and, optionally, a small amount such as 0.5 to 3% of the weight of the pigment of a suitable wetting agent, such as sorbitan mono-oleate, sodium lauryl sulfate, aryl alkyl sodium sulfate, or other oil-in-water emulsifying agent as listed in Appendix 2 of Introduction to Emulsions by Sutheim, published in 1946 by Chemical Publishing Co., Inc. of Brooklyn, New York.

The mill base is milled on a three-roll mill, as in Example 10 until a good distribution of pigment is produced and then incorporated into the aqueous dispersion of film-forming material of Example 10 in place of the mill base of that example.

The pigmented latex thus produced is painted onto a suitable base, such as a steel panel, which has preferably been phosphatized, and after drying, the coating on the panel is heated to about 300° F. to cause fusion of the resinous binder and formation of a pigmented film which adheres to the panel. The film thus formed has substantially decreased water-absorption and has improved gloss over films of similar pigment content but deposited from aqueous dispersion, which do not contain the hydrophobic pigment or the pigment-treating material.

The Werner chromium complex in the above example may be substituted by other Werner chromium complex compounds having hydrocarbon or chlorinated hydrocarbon groups of at least two carbon atoms connected through carboxyl to the chromium.

It is not essential that the silicone compound or chromium complex be unsaturated in the products of the present invention unless a chemical bond to the pigment surface is desired. In polymers having residual unsaturation, some chemical bonding can probably occur through the action of ultraviolet light and certain radiation to which the film is subjected in use.

In place of all or part of the hydrolized vinyl ethoxy silane in the above example, I may use equal molar amounts of any other water-soluble alkyl, alkylene, alkylenyl, or arylsilane or siloxane having at least an oxygen-containing group having only one of the oxygen valences connected to silicon and the other to hydrogen, carbon, or alkali metal may be used, including the siloxanolates of the aforementioned Biefeld et al. patent, and materials in which the vinyl groups are substituted by alkyl, chloralkyl, chloralkylenyl or aryl, but which are still characterized by being soluble in water, as well as the alkoxy-, aryloxy-, and hydroxy siloxanes having an alkyl, chloralkyl, aryl, alkylene alicyclic, etc. group connected to silicon by a carbon-to-silicon bond.

The pigments of the above example may be substituted by other inorganic pigments and other mixtures of pigments, including barytes, zinc oxide, "Hy-Sil," aluminum oxide, lead oxide, lead carbonate, lead chromate, etc. or any inorganic pigment, as is well-known in the art, to obtain various properties. Red iron oxide is particularly desirable for primers. When the coating over the primer is deposited from aqueous emulsion, further improvement is also had by incorporating the reactive silicon compound in the emulsion or dispersion of that coating composition.

The resin may be substituted by other resins which may be fused or which are subject to heat treatment to cause reaction of the silicone treating agent on the surface of the inorganic oxide pigment.

Examples of other resinous materials include polyvinyl halides, particularly polyvinyl chloride, polyvinyl acetate, copolymers of vinyl chloride and vinyl acetate, polystyrene, methyl methacrylate, copolymers of methyl methacrylate and other acrylates, copolymers of styrene with 2-ethyl hexyl acrylate and methacrylic acid and/or acrylonitrile, etc., as desired. Graft polymers of a monoolefinic compound, as above described, on rubbery polymers and copolymers of diolefinic compounds (including polymers, butadiene, chloroprene isoprene, dimethyl butadiene, and copolymers of such with one or more of styrene, acrylonitrile, etc.) are particularly desirable for coating on metal.

The film deposited from aqueous solution after heat treatment contains pigment which has hydrophobic surface portions to substantially improve the permeability of the film to water and to substantially improve the adhesion of pigment to binding material.

In the claims, the terms "aqueous dispersion of film-forming materials" and "aqueous dispersion of film-forming polymer" are used to designate a continuous aqueous phase in the composition as applied to the surface of the metal. The term "polymer" is used in its generic sense to include copolymers.

As used in the claims, the term "polymers of ethylenically unsaturated monomers" is used in the generic sense to include homopolymers, copolymers and interpolymers of one or more olefinic compounds and includes the hydrocarbon resins, coumarone indene resins, etc. which may be obtained from monomers not presegregated from impurities, as well as polymers and copolymers from pure or purposely mixed ethylenically unsaturated monomers.

The term "alkyd resin" includes modified alkyd resins.

It is to be understood that variations and modifications of the specific products and processes herein shown and described for purposes of illustration may be made without departing from the spirit of the invention.

What I claim is:

1. In a coating composition comprising an aqueous oil-in-water type of emulsion of an alkyd resin, the combination therewith of a pigment having over surface portions thereof aliphatic hydrocarbon groups of one to twenty carbon atoms which are adhered to said surface portions through silicon atoms and which render said surface portions of said pigment unwettable by pure water, whereby a relatively glossy and relatively impervious film is produced by drying of said composition because said pigment particles cause the film-forming droplets of said emulsion to coalesce about them rather than to remain as islands between film portions formed by droplets as is the case with hydrophilic pigments.

2. In a coating composition comprising an aqueous oil-in-water type of emulsion of an alkyd resin and an organic solvent therefor, the combination therewith of a pigment having a hydrophobic surface by having adhered over surface portions thereof hydrocarbon groups of one to twenty carbon atoms which are attached to said surface portions through silicon-oxygen linkages.

3. In a coating composition comprising an aqueous oil-in-water type of emulsion of an alkyd resin and a high boiling ester plasticizer and an organic solvent for said resin, the combination therewith of a pigment having over surface portions thereof aliphatic hydrocarbon groups of one to twenty carbon atoms which are adhered to said surface portions through silicon atoms.

4. In a method of making a pigmented emulsion type coating composition wherein inorganic oxide pigment is dispersed in an oil-in-water type emulsion having an organic film-forming material, selected from the group consisting of alkyd resins, polymers from ethylenically unsaturated monomers, ester gum and rosin, dispersed in water in the form of film-forming globules, the improvement which comprises incorporating into said emulsion for at least part of said inorganic oxide pigment an inorganic oxide pigment having a member of the group consisting of hydrocarbon and chlorinated hydrocarbon groups of one to twenty carbon atoms attached to the surface portions thereof through a silicon atom to make said portions unwettable by water.

5. The method of claim 4 wherein the film-forming synthetic resin is an alkyd resin.

6. In a method of making a pigmented emulsion type coating composition wherein titanium dioxide is dispersed in water and mixed with a dispersion of a film-forming material selected from the group consisting of alkyd resins, polymers from ethylenically unsaturated monomers, ester gum, and rosin, the improvement which comprises incorporating into said emulsion a titanium dioxide pigment having a member of the group consisting of hydrocarbon and chlorinated hydrocarbon groups of one to twenty carbon atoms attached to the surface thereof through a silicon atom, whereby surface portions of said pigment are rendered less wettable by water, and upon application of the pigmented aqueous dispersion thus obtained to a surface and drying sufficiently to remove the water, said particles of film-forming material coalesce to form a pigmented film.

7. In a method of forming a film upon a surface without the necessity of using large quantities of volatile solvents, wherein an aqueous dispersion of a film-forming material selected from the group consisting of alkyd resins, polymers from ethylenically unsaturated monomers, ester gum, and rosin, containing an inorganic pigment distributed therein, is applied to said surface and allowed to dry to form a film upon said surface, the improvement which comprises incorporating in said film an inorganic pigment having portions of its surface modified by having bonded thereto through silicon atoms a member of the group consisting of hydrocarbon and chlorinated hydrocarbon groups of one to twenty carbon atoms.

8. The method of claim 4 wherein the film-forming material comprises polyvinyl acetate.

9. The method of claim 4 wherein the film-forming material comprises a polymer of an acrylic ester.

10. The method of claim 7 wherein the film-forming material is a polymer of an ethylenically unsaturated monomer.

11. In a coating composition capable of forming a relatively impervious film, comprising a film-forming aqueous dispersion of a film-forming material selected from the group consisting of alkyd resins, polymers from ethylenically unsaturated monomers, ester gum, and rosin, the improvement which comprises combining therewith a pigment comprising inorganic oxide and having a member of the group consisting of hydrocarbon and chlorinated hydrocarbon groups of one to twenty carbon atoms attached to the surface portions thereof through silicon atoms to make said portions unwettable by water, particles of said pigment in said composition being in aqueous liquid.

12. In a coating composition capable of forming a relatively impervious film, comprising a film-forming aqueous dispersion of a film-forming polymer of an ethylenically unsaturated monomer, the combination therewith of an inorganic oxide pigment having a member of the group consisting of hydrocarbon and chlorinated hydrocarbon groups of one to twenty carbon atoms attached to portions of the surface thereof through silicon atoms to make said portions unwettable by water, particles of said pigment in said composition being in a continuous phase of aqueous liquid.

13. A method of making pigmented film deposited from an aqueous dispersion of a film-forming material, which comprises incorporating into an aqueous dispersion of a film-forming material selected from the group consisting of alkyd resins, polymers from ethylenically unsaturated monomers, ester gum, and rosin, a separately prepared aqueous dispersion of pigment comprising inorganic oxide, a water-soluble organosilicon compound, which has all valences satisfied by a member of the group consisting of carbon, oxygen and hydrogen, which has at least one carbon-silicon bond and which has a member of the group consisting of hydrocarbon and chlorinated hydrocarbon groups of one to twenty carbon atoms and at least one oxygen-containing group having only one valence of an oxygen atom attached to silicon and the other attached to a member of the group consisting of carbon, hydrogen and alkali metal for bonding with the surface of said pigment, whereby upon drying and fusion of a coating deposited from said film, the pigment becomes hydrophobic by reaction with said silicon compound and superior compatibility with the fused film-forming material occurs.

14. An article coated with a pigmented film which comprises (1) an inorganic pigment having a member of the group consisting of hydrocarbon and chlorinated hydrocarbons attached to the surface thereof through a silicon-oxygen linkage, said hydrocarbon groups being attached to silicon through a carbon-silicon bond, and (2) a member of the group consisting of alkyd resins, polymers from ethylenically unsaturated monomers, ester gum and rosin.

15. An article coated with a pigmented film deposited from an aqueous dispersion of a film-forming material, which comprises an inorganic pigment having a member of the group consisting of hydrocarbon and chlorinated hydrocarbons attached to the surface thereof through a silicon atom, a member of the group consisting of alkyd resins, polymers from ethylenically unsaturated monomers, ester gum and rosin.

16. An article according to claim 14 wherein the said pigment comprises red iron oxide.

17. An article according to claim 14 wherein the pigment comprises titanium dioxide.

18. An article having a film according to claim 14 wherein alkyl groups are attached to the surface of the pigment through said silicon-oxygen linkages.

19. An article according to claim 14 wherein alkylene groups are attached to the pigment surface through silicon-oxygen linkages.

20. An article according to claim 14 in which aryl groups are adhered to the pigment surface through silicon-oxygen linkages.

21. A coating composition comprising an aqueous dispersion of a film-forming member of the group consisting of ester gum, rosin, alkyd resins, and polymers of ethylenically unsaturated monomers and a separately formed aqueous slurry of a pigment containing intimately mixed therein .5 to 15% based on the weight of inorganic pigments present in said dispersion of at least one water-soluble organosilicon compound, which has all silicon valences connected to a member of the group consisting of oxygen, carbon and hydrogen, which has at least one carbon-silicon bond linking to silicon a member of the group consisting of hydrocarbon and chlorinated hydrocarbon groups of one to twenty carbon atoms, and which has at least one oxygen-containing group having only one valence of an oxygen atom thereof attached to silicon and the other valence of said oxygen atom attached to a member of the group consisting of carbon, hydrogen and alkali metal, for bonding with the surface of said pigment, whereby upon drying of a coating deposited from said aqueous dispersion and heating of the dried film, surface portions of the pigment become hydrophobic by reaction with said silicon compound and improved compatibility with the film-forming material occurs.

22. The composition of claim 21 wherein the organosilicon compound contains an alkyl group bonded directly to the silicon.

23. The composition of claim 21 wherein the organosilicon compound contains a phenyl group directly bonded to said silicon.

24. The composition of claim 21 wherein the organosilicon compound contains an alkylene group bonded directly to said silicon.

25. The composition of claim 21 wherein the pigment comprises red iron oxide.

26. The composition of claim 21 wherein said ethylenically unsaturated monomer comprises vinyl acetate.

27. The composition of claim 21 wherein said polymer comprises a butadiene-1,3.

28. The composition of claim 21 wherein said solid polymer comprises a copolymer of a butadiene-1,3 and styrene.

29. In a coating composition comprising an aqueous dispersion of a film-forming polymer of an ethylenically unsaturated monomer and of a pigment, the improvement which comprises, a separately formed pigment dispersion containing intimately distributed therethrough .5 to 15% based on the weight of inorganic pigments present in said dispersion of at least one water-soluble, hydroxyl-reactive organosilicon compound, which has all silicon valences satisfied by a member of the group consisting of oxygen, hydrogen and carbon, which has at least one carbon-silicon bond carrying a member of the group consisting of hydrocarbon and chlorinated hydrocarbon groups of one to twenty carbon atoms, and which has at least one oxygen-containing group having only one valence of an oxygen atom thereof attached to silicon for bonding with the surface of said pigment, whereby upon drying of a coating deposited from said aqueous dispersion and heating of the dried film, surface portions of the pigment become hydrophobic by reaction with said silicon compound and improved compatibility with the film-forming material occurs.

30. The composition of claim 21 wherein said "other valence" is connected to nitrogen of an ammonium group.

31. The composition of claim 29 wherein the film-forming polymer of ethylenically unsaturated monomer is a graft polymer of a monoolefinic monomer on a rubbery polymer of a diolefinic compound.

32. The composition of claim 29 wherein the polymer of ethylenically unsaturated monomer is a graft polymer of methyl methacrylate on a rubbery polymer of a diolefinic compound.

References Cited in the file of this patent
UNITED STATES PATENTS
2,751,369   Te Grotenhuis _____ June 19, 1956